(12) United States Patent
Shirakata et al.

(10) Patent No.: US 9,065,538 B2
(45) Date of Patent: Jun. 23, 2015

(54) TRANSMISSION-RECEPTION DEVICE (75) Inventors: Naganori Shirakata, Kanagawa (JP); Tadashi Morita, Kanagawa (JP)

(73) Assignee: Panasonic Corporation, Osaka (JP)

( * ) Notice: Subject to any disclaimer, the term of this patent is extended or adjusted under 35 U.S.C. 154(b) by 203 days.

(21) Appl. No.: 13/814,914

(22) PCT Filed: Jan. 31, 2012

(86) PCT No.: PCT/JP2012/000648
§ 371 (c)(1),
(2), (4) Date: Feb. 7, 2013

(87) PCT Pub. No.: WO2012/132185
PCT Pub. Date: Oct. 4, 2012

(65) Prior Publication Data
US 2013/0157589 A1    Jun. 20, 2013

(30) Foreign Application Priority Data
Mar. 30, 2011   (JP) ................................. 2011-075832

(51) Int. Cl.
*H04B 1/10*   (2006.01)
*H04B 1/40*   (2015.01)
*H04L 27/26*  (2006.01)
(Continued)

(52) U.S. Cl.
CPC .............. *H04B 1/40* (2013.01); *H04L 27/2636* (2013.01); *H04L 25/068* (2013.01); *H04L 27/32* (2013.01); *H04L 27/367* (2013.01)

(58) Field of Classification Search
CPC ........... H04B 1/0475; H04B 1/10; H04B 1/44
USPC .................... 455/63.1, 296, 114.2
See application file for complete search history.

(56) References Cited

U.S. PATENT DOCUMENTS 5,612,978 A * 3/1997 Blanchard et al. ............ 375/350
7,133,825 B2 * 11/2006 Bou-Ghazale ................ 704/233
(Continued)

FOREIGN PATENT DOCUMENTS

| JP | 2000-244370 A | 9/2000 |
| JP | 2007-195056 A | 8/2007 |
| JP | 2010-252178 A | 11/2010 |

OTHER PUBLICATIONS

International Search Report, mailed May 1, 2012, for International Application No. PCT/JP2012/000648, 2 pages.

*Primary Examiner* — Wen Huang
(74) *Attorney, Agent, or Firm* — Seed IP Law Group PLLC (57) ABSTRACT

A transmission-reception device includes a radio frequency section that performs a frequency conversion on a signal which is modulated using a single carrier transmission system, a correction coefficient multiplier that multiplies a frequency domain signal by a distortion correction coefficient in the frequency conversion of the radio frequency section to correct a distortion, a first transformer that converts a time domain signal into a frequency domain signal at a time of reception, and converts the frequency domain signal which is distortion-corrected by the correction coefficient multiplier into a time domain signal at a time of transmission, and a second transformer that converts a time domain signal into a frequency domain signal at a time of transmission, and converts the frequency domain signal which is distortion-corrected by the correction coefficient multiplier into a time domain signal at a time of reception.

6 Claims, 8 Drawing Sheets

(51) Int. Cl.
   *H04L 25/06*  (2006.01)
   *H04L 27/36*  (2006.01)
   *H04L 27/32*  (2006.01)

(56) References Cited

U.S. PATENT DOCUMENTS 7,333,423 B2 *  2/2008  Palaskas et al. .............. 370/210
7,548,589 B2 *  6/2009  Kim .............................. 375/267
7,894,556 B2 *  2/2011  Casabona et al. ............. 375/346
8,085,878 B2 * 12/2011  Choi et al. .................... 375/326
2006/0135211 A1 *  6/2006  Chae et al. ................. 455/562.1
2009/0227278 A1 *  9/2009  Cho et al. ...................... 455/522
2010/0297969 A1 * 11/2010  Miyoshi et al. ............. 455/127.1

* cited by examiner

TRANSMISSION-RECEPTION DEVICE

TECHNICAL FIELD

The present invention relates to a transmission-reception device that transmits and receives a modulation signal using a single carrier transmission system.

BACKGROUND ART

In recent years, a service has been considered that provides end-users with data which includes a variety of large volume content using high-resolution images (including moving images and still images) or voices through wireless communications.

Particularly, in order to transmit large volume data ranging several G (Giga) bits at high speed, a wireless communication system has been considered which performs a high speed transmission of several G bps using a millimeter wave band including 60 GHz band. In particular, in the IEEE (Institute of Electrical and Electronics Engineering), a standardization work for IEEE 802.15.3c, for example, as a wireless PAN, or for IEEE 802.11ad, for example, as a wireless LAN, has been performed.

For example, in a single carrier communication using a millimeter wave band studied in the IEEE 802.11 ad, a PSK or a QAM modulation signal is transmitted at the speed of 1.76 G symbol/sec. 1 symbol time is as short as 0.57 nsec.

On the other hand, in a radio frequency (RF) circuit in which a modulated baseband signal is up-converted into a 60 GHz band and transmitted from an antenna, broadband communication characteristics are required. Since the signal has a broadband with a bandwidth of 1.76 GHz, in order to achieve a transmission in which a signal distortion does not arise, it is required that passband characteristics of the RF circuit be flat all over the bands of the signal.

However, actually, it is difficult for a mixer or a power amplifier in which the signal is converted into radio frequency of 60 GHz to have flat passband characteristics all over the bands of the signal.

As a method of correcting a distortion of passband characteristics in an RF circuit, a pre-distortion method using a digital baseband signal is known. In this method, the passband characteristics of the RF circuit are measured in advance to obtain a digital filter coefficient which is inverse characteristics of a measured result, and then a distortion correction is performed to cause the passband characteristics to be flat by filtering a transmission signal when the signal passes through the RF circuit.

As a wireless communication system using the pre-distortion, for example, Patent Literature 1 and Patent Literature 2 are known. The wireless communication device disclosed in Patent Literature 1 detects frequency distortion characteristics of a loopback signal from a transmission side to a reception side in the RF circuit, holds a time domain signal to which a difference spectrum from ideal characteristics is transformed by means of an inverse Fourier transform, and corrects the distortion by adding the signal to an FIR filter at the time of transmission.

In addition, in a digital wireless communication device disclosed in Patent Literature 2, the pre-distortion is performed in a frequency domain signal. In the digital wireless communication device, the time domain signal which is oversampled L times by inserting a zero sample is transformed by means of an N point Fourier transform, and then is weighted in a frequency domain. After the weighting, the digital wireless communication device shifts a frequency bin to change a center frequency, and transforms the signal to the time domain signal by means of an N point inverse Fourier transform and then outputs the transformed signal.

CITATION LIST

Patent Literature

Patent Literature 1: JP-A-2000-244370
Patent Literature 2: JP-A-2010-252178

SUMMARY OF INVENTION

Technical Problem

However, in a wireless communication device in the related art described above, there is a problem as follows. Specifically, in the related art described above, with respect to a signal in which a symbol of a transmission signal is oversampled (interpolation) in a DA converter, it is necessary to provide a pre-distortion filter.

That is, when the wireless communication device in the related art is applied to a millimeter wave communication, for example, even in a case of two times oversampling, it is necessary to use a digital filter with respect to a time domain signal of 3.52 Gsps (samples per second).

In order to increase a frequency resolution in passband characteristics of an RF circuit, which are corrected using an interpolation filter and a pre-distortion filter, a circuit size increases because an FIR filter of dozen taps is required. In addition, a processing clock speed is required to be increased for a filter operation.

The present invention is made in consideration of such circumstances, and an object thereof is, even in a baseband signal having a broad signal-bandwidth due to a high symbol speed, to provide a transmission-reception device which accurately corrects the passband characteristics without increasing the circuit size.

Solution to Problem

A transmission-reception device according to the present invention includes: a radio frequency section that performs a frequency conversion on a signal which is modulated using a single carrier transmission system; a correction coefficient multiplier that multiplies a frequency domain signal by a distortion correction coefficient in the frequency conversion of the radio frequency section to correct a distortion; a first transformer that converts a time domain signal into a frequency domain signal at a time of reception, and converts the frequency domain signal which is distortion-corrected by the correction coefficient multiplier into a time domain signal at a time of transmission; and a second transformer that converts a time domain signal into a frequency domain signal at a time of transmission, and converts the frequency domain signal which is distortion-corrected by the correction coefficient multiplier into a time domain signal at a time of reception.

Advantageous Effects of Invention

According to the present invention, in a distortion correction at the time of transmission, since a correction coefficient multiplier, a first transformer and a second transformer may be shared at the time of reception, passband characteristics may be corrected with high accuracy without significantly increasing the circuit size at the time of transmission.

BRIEF DESCRIPTION OF DRAWINGS

FIG. 7 indicates diagrams illustrating signals at each signal inside a distortion correction section at the time of transmission using spectrums, in which (A) illustrates a spectrum of a modulation signal with a symbol speed of fs from a modulator, (B) illustrates a spectrum of a frequency domain signal to which a sample sequence is transformed by FFT with 64 points, (C) illustrates a spectrum of a frequency domain signal where a frequency band is expanded by a two times oversampling for each frequency bin, (D) illustrates a spectrum of a signal of a transmission distortion correction coefficient, (E) illustrates a spectrum of a frequency domain signal after multiplication of a transmission distortion correction coefficient, (F) illustrates a spectrum of a baseband signal, and (G) illustrates a spectrum of a frequency domain signal in which a distortion in a transmission side of an RF section is corrected.

DESCRIPTION OF EMBODIMENTS

Embodiments of a transmission-reception device according to the present invention will be described with reference to the drawings. The transmission-reception device according to the present invention is applied to a transmission-reception device which transmits and receives a wireless signal having a millimeter wave band.

(A Signal Format)

Figure 3:
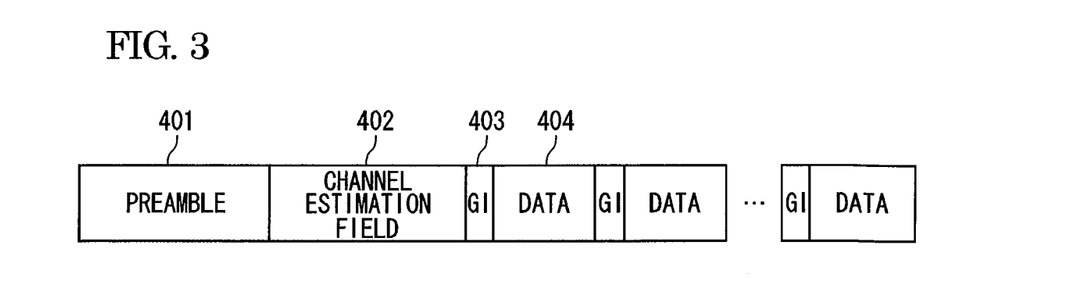
FIG. 3 is a diagram illustrating an example of a frame format of a transmission signal.

FIG. 3 is a diagram illustrating an example of a frame format of a transmission signal. The frame format of the transmission signal has a configuration including a preamble 401, a channel estimation field 402, a guard interval (GI) 403 and data 404.

The preamble 401 includes a waveform which is obtained by repeating a known signal waveform multiple times. For example, in the preamble 401, by setting a signal waveform where a Golay sequence with 128 bits having excellent correlation characteristics is subject to BPSK modulation as one unit, the waveform is used which is obtained by repeating one unit of the signal waveform multiple times. The transmission-reception device according to the invention, obtains the repetition of the known waveform using correlation detection, and uses the repetition for synchronization processing including at least one or more tasks among frame detection, a gain control and a synchronization of a carrier frequency.

The channel estimation field 402 similarly including a plurality of the known signal waveforms is used for an estimation of a distortion in a channel in the transmission-reception device according to the invention. For example, in the channel estimation field 402, a signal waveform is used where a Golay sequence with 128 bits and a complementary sequence of the Golay sequence are subjected to the BPSK modulation.

The guard interval 403 is inserted as a divider for the data 404. In the guard interval 403 also, the known signal waveform, for 64 bits is modulated.

The data 404 includes a PSK or QAM modulation symbol sequence to which a data bit sequence which is encoded for error correction for each block unit is modulated.

A symbol sequence of a transmission signal which is digitally modulated using a frame format (signal format) described above is filtered by using a root raised cosine filter as a transmission band limitation filter, and is converted into an analog baseband signal by a DA converter. The baseband signal is converted into a single carrier radio frequency signal in a radio frequency (RF) section (refer to FIG. 1) and is transmitted from an antenna.

(Configuration of Transmission-Reception Device)

Figure 1:
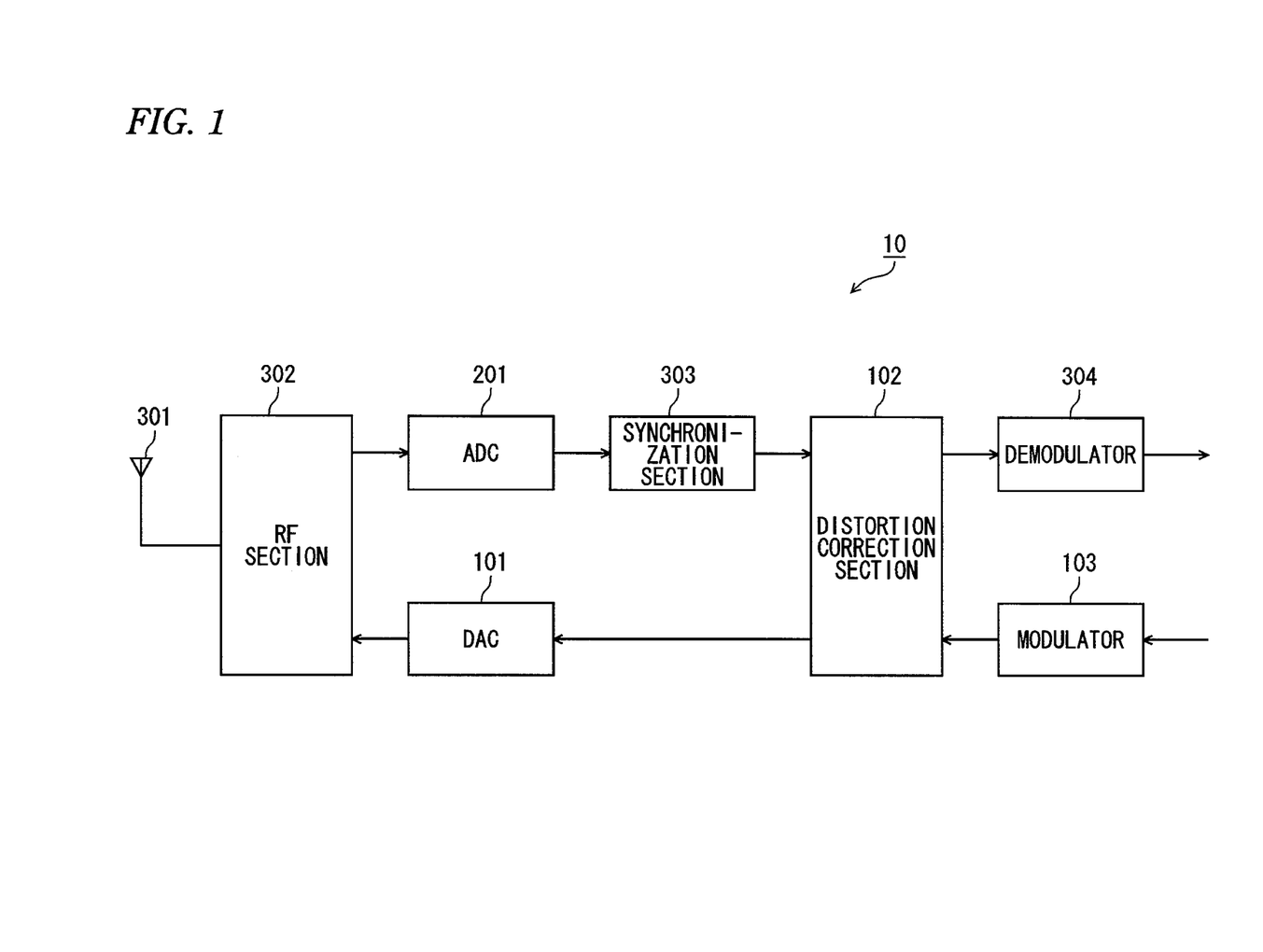
FIG. 1 is a block diagram illustrating an overall configuration of a transmission-reception device.

FIG. 1 is a block diagram illustrating an overall configuration of a transmission-reception device 10. The transmission-reception device 10, as illustrated in FIG. 1, has a configuration including an antenna 301, a radio frequency section (RF section) 302, an AD converter 201, a synchronization section 303, a distortion correction section 102, a demodulator 304, a DA converter 101, and a modulator 103.

In addition, the RF section 302 includes a configuration of a transmission side for an up-conversion of a signal subjected to the single carrier modulation by the modulator 103, and a configuration of a reception side for a down-conversion of the single carrier radio frequency signal received by the antenna 301.

At the time of transmission, the distortion correction section 102 corrects transmission distortion characteristics that are added to a symbol sequence which is digitally modulated (single carrier modulation) in the modulator 103 by the transmission side of the RF section 302, and outputs the result to the DA converter 101.

The DA converter 101 converts the output signal from the distortion correction section 102 into the analog baseband signal. The transmission side of the RF section 302 up-converts the analog baseband signal into the single carrier radio frequency signal, and transmits it via the antenna 301.

At the time of reception, the reception side of the RF section 302 down-converts the single carrier radio frequency signal received by the antenna 301 into a baseband signal. The reception side of the RF section 302 outputs the baseband signal to the AD converter 201. The AD converter 201 converts the baseband signal into the digital signal by sampling the output signal from the reception side of the RF section 302.

The synchronization section 303 performs a synchronization processing including at least one or more tasks among frame detection, a gain control of the RF section 302, and a synchronization of a carrier frequency, using the preamble 401 in the reception signal which is a converted digital signal.

The distortion correction section 102 estimates a channel distortion using the channel estimation field 402, according to a frame timing detected in the synchronization section 303, and corrects distortion characteristics of a channel of subsequent data 404 and then outputs a symbol sequence.

The demodulator 304 inputs the symbol sequence which is output from the distortion correction section 102 and determines a signal point to demodulate the data, and reproduces transmission data.

Figure 2:
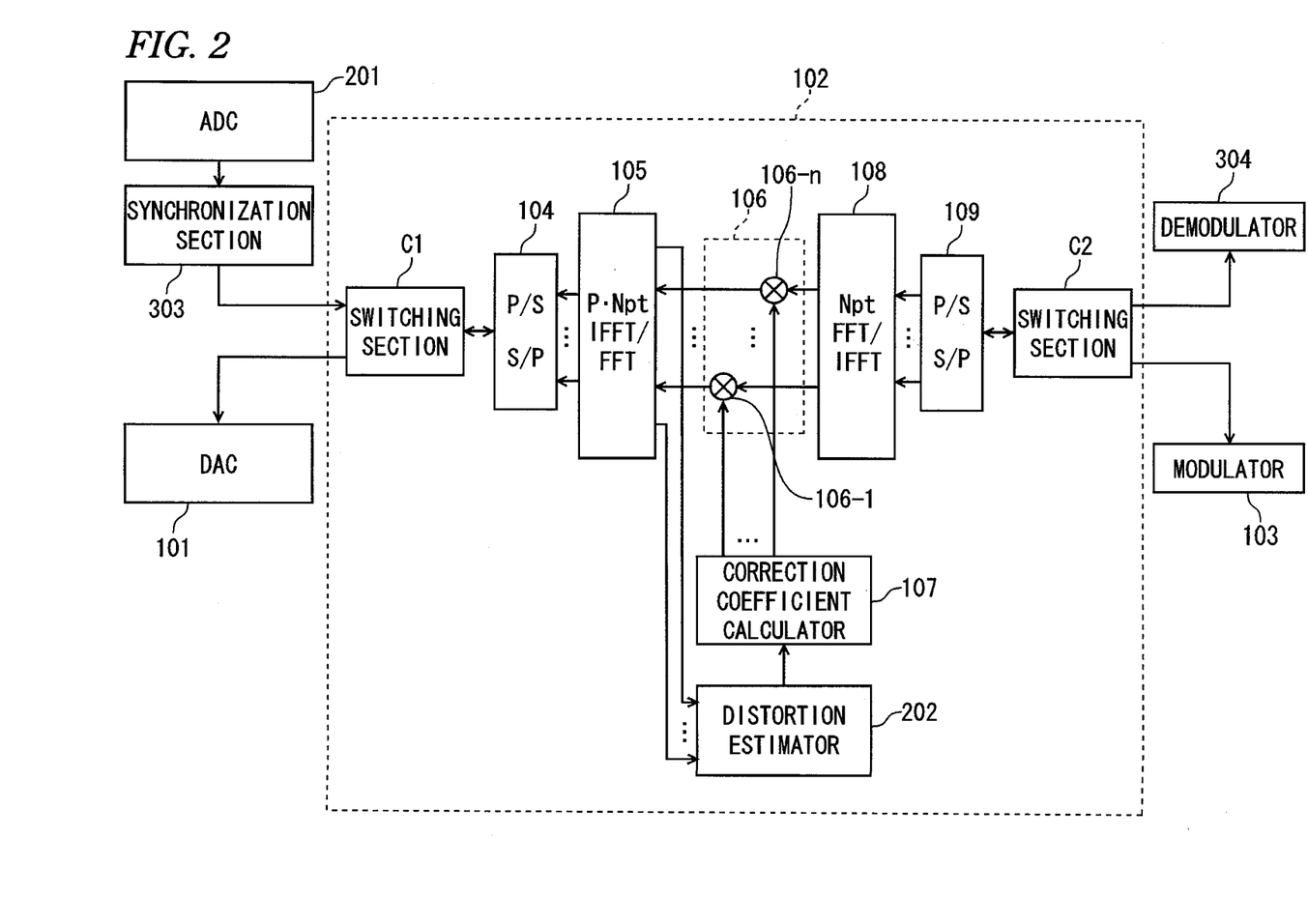
FIG. 2 is a block diagram illustrating an internal configuration of a distortion correction section.

FIG. 2 is a block diagram illustrating an internal configuration of the distortion correction section 102. The distortion correction section 102, as illustrated in FIG. 2, has a configuration including a switching section C1, a parallel/serial converter 104, a PN point inverse-Fourier/Fourier transformer 105, a correction coefficient multiplier 106 (106-1 to 106-n), a correction coefficient calculator 107, a distortion estimator 202, an N point Fourier/inverse-Fourier transformer 108, a serial/parallel converter 109, and a switching section C2.

The switching section C1 switches the paths in order to output a reception signal from the synchronization section 303 to the parallel/serial converter 104 at the time of reception or calibration, and in order to output a transmission signal from the parallel/serial converter 104 to the DA converter 101 at the time of transmission.

The parallel/serial converter 104 converts a serial signal into a parallel signal at the time of reception or calibration and converts the parallel signal into the serial signal at the time of transmission.

The PN point inverse-Fourier/Fourier transformer 105 as a first transformer performs a Fourier transform or an inverse Fourier transform by reversing the sign of rotate operation with a unit of a frequency domain signal or a time domain signal having P×N points.

More specifically, the PN point inverse-Fourier/Fourier transformer 105 performs a Fourier transform with a time domain signal having P×N points as a unit at the time of reception or calibration and converts the transformed signal into a frequency domain signal having P×N points.

In addition, the PN point inverse-Fourier/Fourier transformer 105 performs an inverse Fourier transform with a unit of the frequency domain signal having P×N points at the time of transmission and converts the transformed signal into the time domain signal having P×N points.

The switching section C2 switches the paths in order to output the reception signal from the serial/parallel converter 109 to the demodulator 304 at the time of reception or calibration, and in order to output the transmission signal from the modulator 103 to the serial/parallel converter 109 at the time of transmission.

The serial/parallel converter 109 converts the parallel signal into the serial signal at the time of reception or calibration and converts the serial signal into the parallel signal at the time of transmission.

The N point Fourier/inverse-Fourier transformer 108 as a second transformer performs a Fourier transform or an inverse Fourier transform, as it can be realized by reversing the sign of the rotate operation, with a unit the time domain signal or the frequency domain signal having N points.

Specifically, the N point Fourier/inverse-Fourier transformer 108 performs an inverse Fourier transform with the frequency domain signal having N points as a unit at the time of reception or calibration and converts the transformed signal into the time domain signal having N points.

In addition, the N point Fourier/inverse-Fourier transformer 108 performs a Fourier transform with a unit of the time domain signal having N point and converts the transformed signal into a frequency domain signal having N points at the time of transmission.

Each section can be shared with the distortion correction section 102 by changing a processing direction of the signal in any timing among the time of transmission, reception and calibration.

Next, an operation of the distortion correction section 102 will be described in detail.

(Operation at the Time of Calibration)

The operation of the distortion correction section 102 at the time of calibration will be described. In the calibration, transmission distortion characteristics in the transmission side of the RF section 302 are measured and a transmission distortion correction coefficient for correcting the transmission distortion characteristics is obtained. In addition, the reception distortion characteristics in the reception side of the RF section 302 are already calibrated, a reception distortion correction coefficient for correcting the reception distortion characteristics is considered to be obtained in advance.

Furthermore, in the calibration of the reception distortion characteristics, for example, a reference signal from a measuring instrument is input to the reception side of the RF section 302, and the reception distortion characteristics are measured using a method similar to the method described below and thereby the reception distortion correction coefficient may be obtained.

Figure 4:
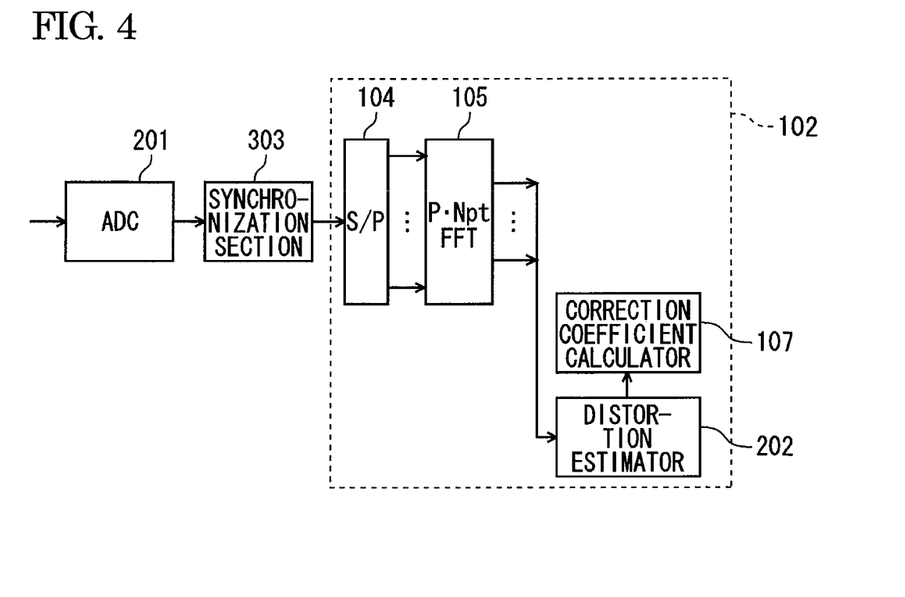
FIG. 4 is a block diagram illustrating an internal configuration of a distortion correction section at the time when a calibration is performed for transmission distortion characteristics.

FIG. 4 is a block diagram illustrating an internal configuration of the distortion correction section 102 at the time of calibration of the transmission distortion characteristics. Further, in FIG. 4, the switching section C1 is not illustrated. At the time of calibration, the DA converter 101 inputs the reference signal having the known signal waveform from outside of the transmission-reception device 10 and outputs the signal to the transmission side of the RF section 302, and further inputs the signal which is subjected to the loopback to the AD converter 201 via the reception side of the RF section 302. In other words, the loopback signal from the transmission side of the RF section 302 to the reception side of the RF section 302 is input to the RF section 302.

Here, any signal may be used as the reference signal if it is a signal having the known signal waveform, for example, a modulation signal of the preamble 401 of the transmission signal may be used. Alternatively, any sinusoidal wave signal with arbitrary frequency may be used. It is preferable to use a broadband signal in which signal band frequency characteristics of the transmission signal can be measured or a signal to which a narrowband signal of the sinusoidal wave subjected to frequency-sweep in the signal band.

The AD converter 201 inputs the reference signal which is a loopback signal in the RF section 302 to perform a sampling and outputs a digital signal after the sampling to the parallel/serial converter 104 via the synchronization section 303 and the switching section C1.

The parallel/serial converter 104 converts the input digital signal (serial signal) into the parallel signal and outputs the parallel signal to the PN point inverse-Fourier/Fourier transformer 105.

The PN point inverse-Fourier/Fourier transformer 105 performs a Fourier transform with respect to the time domain signal which is an input signal from the parallel/serial converter 104, and converts the transformed signal into the frequency domain signal. The PN point inverse-Fourier/Fourier transformer 105 selects a signal with a signal band from the frequency domain signal to output the signal to the distortion estimator 202.

The distortion estimator 202 corrects the frequency domain signal with the input signal band using the reception distortion characteristics of the RF section 302, which are obtained in advance, and then obtains a difference vector between the frequency domain signal after the correction and the frequency domain signal of the known reference signal, for each frequency bin (range). The difference vector corresponds to the transmission distortion characteristics in the transmission side of the RF section 302.

The correction coefficient calculator 107 obtains a correction vector which is inverse characteristics of the estimated transmission distortion characteristics, based on the transmission distortion characteristics estimated by the distortion estimator 202, and holds the transmission distortion correction coefficient which corresponds to the correction vector. Furthermore, in the correction coefficient calculator 107, the correction vector may be weighted for each frequency bin using the frequency domain characteristics of a root raised cosine filter which is obtained in advance as a transmission band limitation filter.

Figure 5:
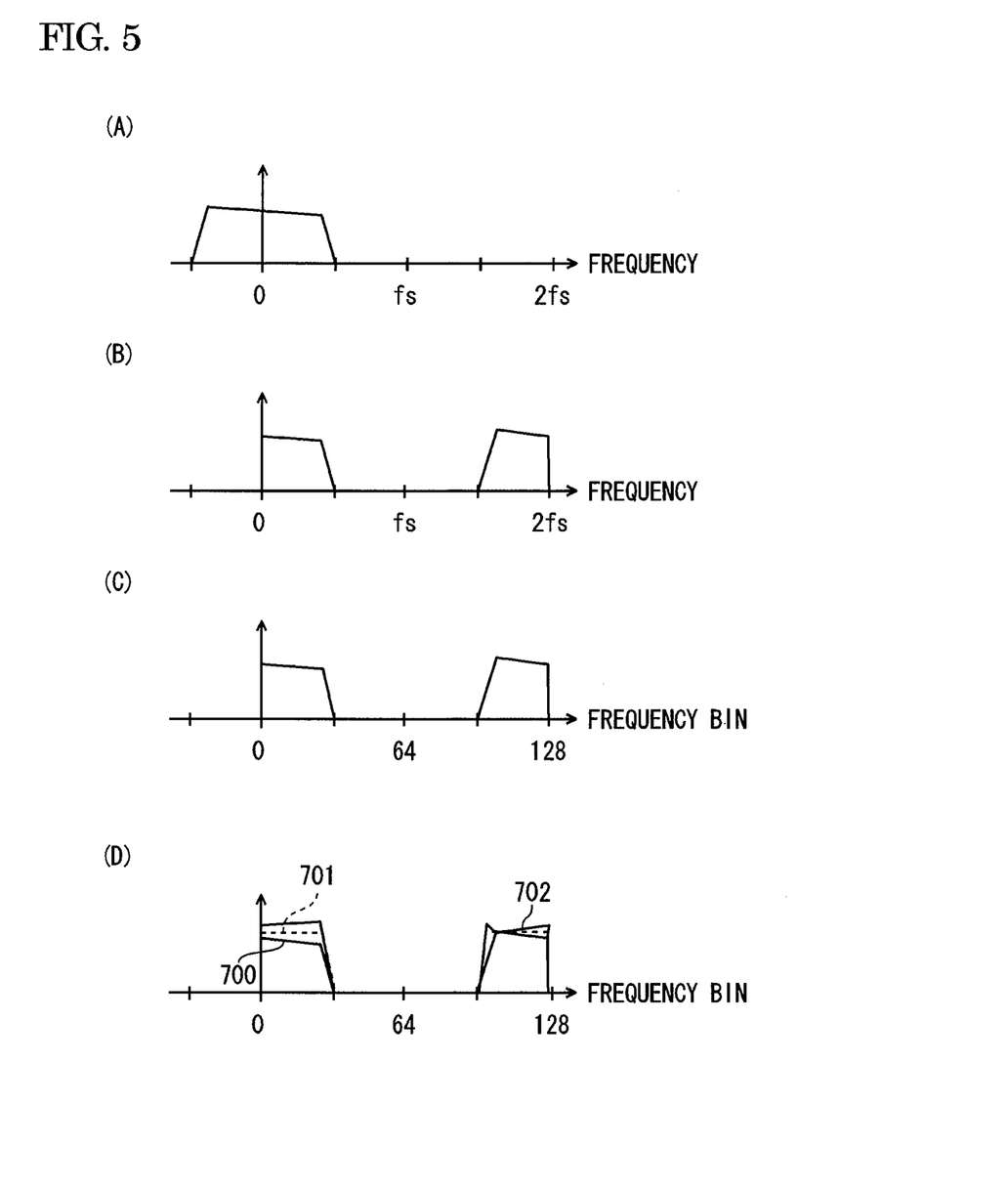
FIG. 5 indicates diagrams illustrating signals of each section in the distortion correction section using spectrums at the time of a calibration, in which (A) illustrates a spectrum of a baseband signal input to an AD converter, (B) illustrates a spectrum of a signal after two times oversampling of the baseband by the AD converter, (C) illustrates a spectrum of a frequency domain signal to which a sample sequence is transformed by FFT with 128 points, and (D) illustrates a spectrum of a frequency domain signal corresponding to inverse characteristics of distortion characteristics.

FIG. 5 shows diagrams illustrating signals of each section in the distortion correction section 102 using spectrums at the time of calibration. The reference signal for the calibration is understood as a signal which has the same bandwidth fs (Hz) as the transmission signal.

FIG. 5(A) illustrates a spectrum of the baseband signal input to the AD converter 201. The baseband signal is a complex signal and shows a spectrum having the bandwidth fs (Hz) with centering on DC component (0 Hz).

FIG. 5(B) illustrates a spectrum of a signal after two times oversampling of the baseband by the AD converter 201. A sampling speed is 2 fs (Hz) and a repetition (aliasing) occurs around fs (Hz).

FIG. 5(C) illustrates a spectrum of the frequency domain signal to which a sample sequence is transformed by means of FFT with 128 points. A horizontal axis illustrates a frequency bin (K=0 to 127) where 2 fs (Hz) is discretized to 128 points. The signal band exists in the frequency bin ranging k=0 to 31 and k=96 to 127.

As illustrated in FIG. 5(D), with respect to the frequency bin equivalent to the signal band of 64 points, a difference between signal band characteristics 700 (refer to FIG. 5(C)) and ideal frequency characteristics 701 (dotted line) becomes the transmission distortion characteristics. The correction coefficient calculator 107 obtains a transmission distortion correction coefficient 702 (solid line) which is the inverse characteristics of the transmission distortion characteristics, and stores it in the correction coefficient calculator 107.

Here, an operation of calibration in the distortion correction section 102 will be described using numerical expressions.

It is assumed that there are the transmission signal x(t), the loopback reception signal r(t), the pass band characteristics of the transmission side of the RF section 302 h_t x(t), and the pass band characteristics of the reception side of the RF section 302 hr x(t).

In addition, if assumed that values where the transmission signal x(t), the loopback reception signal r(t), the pass band characteristics of the transmission side of the RF section 302 h_t x(t), and the pass band characteristics of the reception side of the RF section 302 h_r x(t) are subjected to the Fourier transform are repectively X(f), R(f), H_tx(f), H_rx(f), then expression (1) is obtained.

[Expression 1]

$$R(f)=H\_rx(f)H\_tx(f)X(f) \quad (1)$$

In addition, the reference signal for calibration is set to x_ref(t), a value after x_ref(t) is subjected to the Fourier transform to is set to X_ref(f), the reference signal subjected to the loopback to the reception side of the RF section 302 is set to r_ref(t), and a value after r_ref(t) is subjected to the Fourier transform is set to R_ref(f), and then the pass band characteristics H(f) of the RF section 302 can be obtained by expression (2).

[Expression 2]

$$H(f)=R\_ref(f)/X\_ref(t) \quad (2)$$

Here, if the pass band characteristics H_rx(f) in the reception side of the RF section 302 which are obtained in advance are used, communication band characteristics H_tx(f) are obtained as illustrated in expression (3).

[Expression 3]

$$H\_tx(f)=H(f)/H\_rx(f) \quad (3)$$

That is, 1/H_tx(f) can be obtained as the transmission distortion coefficient 702 (refer to FIG. 7) which is the inverse characteristics of transmission distortion characteristics, by the calibration of the distortion correction section 102.

(Operation at the Time of Transmission)

Figure 6:
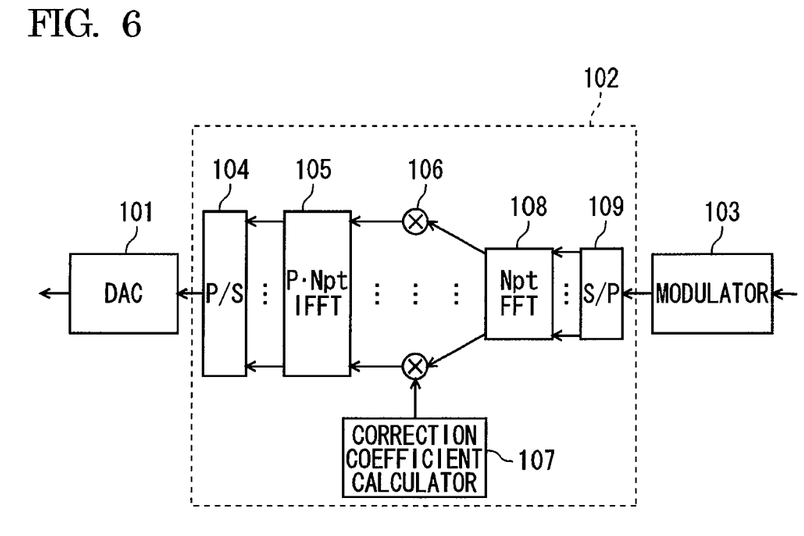
FIG. 6 is a block diagram illustrating an internal configuration of a distortion correction section at the time of transmission.

Next, an operation which corrects the transmission signal using the transmission distortion correction coefficient which is obtained at the time of calibration by the distortion correction section 102 will be described. FIG. 6 is a block diagram illustrating an internal configuration of the distortion correction section 102 at the time of transmission. In addition, the switching section C2 is not illustrated in FIG. 6.

At the time of transmission, the serial/parallel converter 109 inputs the symbol sequence (a serial signal) which is modulated at a symbol speed of fs (Hz) by the modulator 103 via the switching section C2, and converts the symbol sequence into the parallel signal for each N symbols.

The N point Fourier/inverse-Fourier transformer 108 performs the Fourier transform for an N symbol signal which is the input parallel signal and converts the transformed signal into the frequency domain signal having N points, which can be configured by a complex vector for each frequency bin.

In addition, the N point Fourier/inverse-Fourier transformer 108 expands the band of the frequency domain signal having N points to P×N points in order to enable the P times oversampling(P>1) which is necessary for the DA converter 101 to perform an analog signal conversion.

More specifically, the N point Fourier/inverse-Fourier transformer 108 duplicates the complex vector in the signal band of the frequency domain signal into another band of the same frequency bin in order to generate an aliasing component of the signal band equivalent to the oversampling.

The correction coefficient multiplier 106, for each frequency bin, multiplies the frequency domain signal which is band-expanded to P×N points by means of the inverse Fourier transformer 108, by the transmission distortion correction coefficient obtained by the correction coefficient calculator 107. The correction coefficient multiplier 106 outputs the result of the multiplication to the PN point inverse-Fourier/Fourier transformer 105.

The PN point inverse-Fourier/Fourier transformer 105 performs the inverse Fourier transform on the result of the multiplication from the correction coefficient multiplier 106, that is, the frequency domain signal having P×N points multiplied by the transmission distortion correction coefficient, and converts the transformed signal into the time domain signal. The PN point inverse-Fourier/Fourier transformer 105 outputs the time domain signal to the parallel/serial converter 104.

The time domain signal is a sample sequence which is P times oversampled with respect to the symbol sequence which of the original N symbols. The sample sequence with P×N samples is converted into the serial signal in the parallel/serial converter 104.

The parallel/serial converter 104 outputs the sample sequence in a central part where the first and the last several samples which are affected by a waveform truncation due to FFT and IFFT are removed among P×N samples, for example, the sample sequence with P×N/2 samples in central part.

In addition, in the transmission-reception device 10, the N symbol which is subject to correction, among the symbol sequence input from the modulator 103 to the distortion correction section 102 is input while being overlapped for each N/2 symbol. Accordingly, continuity in the sample sequence output from the distortion correction section 102 is maintained.

Figure 7:
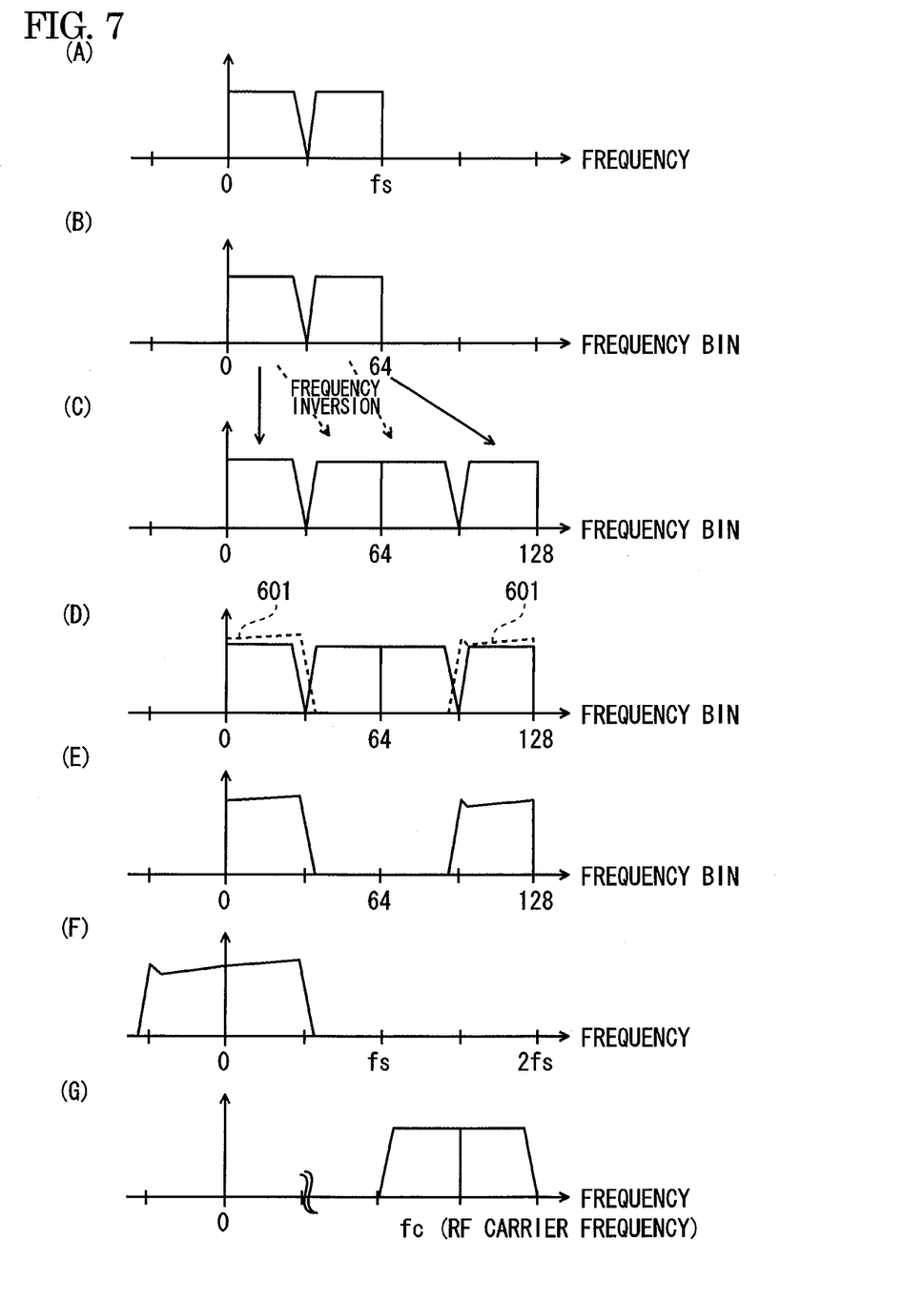

FIG. 7 shows diagrams illustrating each signal inside the distortion correction section 102 using spectrums. FIG. 7(A) illustrates a spectrum of the modulation signal with a symbol speed fs (Hz) from the modulator 103. Since the sample sequence has the same symbol speed fs (Hz) and sample speed, the repetition occurs at fs/2 (Hz) in FIG. 7(A).

FIG. 7(B) illustrates a spectrum of the frequency domain signal to which the sample sequence is transformed by means of FFT with 64 points. The horizontal axis illustrates the frequency bin (k=0 to 63) in which fs (Hz) is discretized to 64 points.

FIG. 7(C) illustrates the spectrum of the frequency domain signal which is band-expanded by two times oversampling for each frequency bin. As illustrated in FIG. 7(C), the N point Fourier/inverse-Fourier transformer 108 expands the band of the frequency domain signal in order for the DA converter 101 to perform two times (P=2) oversampling.

In other words, in a case where the frequency band is expanded to 128 points due to the two times oversampling, the N point Fourier/inverse-Fourier transformer 108 duplicates a signal band component with respect to the frequency bin which is an aliasing frequency, in order to generate a signal aliasing component of the original signal band.

FIG. 7(D) illustrates a spectrum of a signal of the transmission distortion correction coefficient 601. As illustrated in FIG. 7(D), if the frequency domain signal having 128 points, in which an oversampling is performed by the correction coefficient multiplier 106 is multiplied by the transmission distortion correction coefficient 601, the frequency domain signal after the transmission distortion is corrected can be obtained (refer to FIG. 7(E)). FIG. 7(E) illustrates a spectrum of the frequency domain signal after the multiplication of the transmission distortion correction coefficient. In a case where the root raised cosine filter (RRC filter) is also included in the transmission distortion correction coefficient 601, the above multiplication also acts as the transmission band limitation filter.

In the PN point inverse-Fourier/Fourier transformer 105, the corrected frequency domain signal is converted into the time domain signal by means of the inverse Fourier transform in the 128 point IFFT, and is output to the DA converter 101 via the switching section C1. In the DA converter 101, when the input time domain signal is converted into the analog signal, a spectrum of the baseband signal illustrated in FIG. 7(F) can be obtained.

In addition, in the RF section 302, as illustrated in FIG. 7(G), the baseband signal is modulated using a single carrier frequency fc. FIG. 7(G) illustrates the spectrum of a frequency domain signal in which a distortion in the transmission side of the RF section is corrected.

Here, an operation of the distortion correction at the time of transmission in the distortion correction section 102 will be described using numerical expressions.

The correction coefficient multiplier 106 obtains a signal X" (f) represented by expression 4 (refer to FIG. 7(E)) in such a way of multiplying a frequency domain signal x'(f) (refer to FIG. 7(D)), in which the Fourier transform and the oversampling are performed on a transmission signal x (t), by a frequency domain representation C_filt (f) having the transmission RRC filter characteristics, and a correction coefficient 1/H_tx(f) which corrects the passband characteristics of the transmission side of the RF section 302.

[Expression 4]

$$X''(f) = X'(f) C\_\text{filt}(f) / H\_tx(f) \quad (4)$$

The PN point inverse-Fourier/Fourier transformer 105 performs the inverse Fourier transform to transform the frequency domain signal X"(f) obtained by the expression 4 to the time domain signal x"(t) (refer to FIG. 7(F)). The time domain signal x"(t) is transmitted from the antenna 301 via the transmission side of the RF section 302. The signal x'"(t) is represented by expression 5.

[Expression 5]

$$x'''(t) = x''(t) * h\_tx(t) \quad (5)$$

A symbol "k" represents a convolution operation. If the Fourier transform is performed on the signal x'", and the signal is represented by the frequency domain, it is represented by expression 6.

[Expression 6]

$$X'''(f) = X''(f) H\_tx(f) \quad (6)$$
$$= X' C\_\text{filt}(f)$$

In the transmission-reception device 10, a signal distortion which occurs in the transmission side of the RF section 302 can be corrected and a signal multiplied by a transmission filter can be transmitted (refer to FIG. 7(G)). FIG. 7(G) illustrates a spectrum of a signal in which a distortion in the transmission side of the RF section 302 is corrected.

Figure 8:
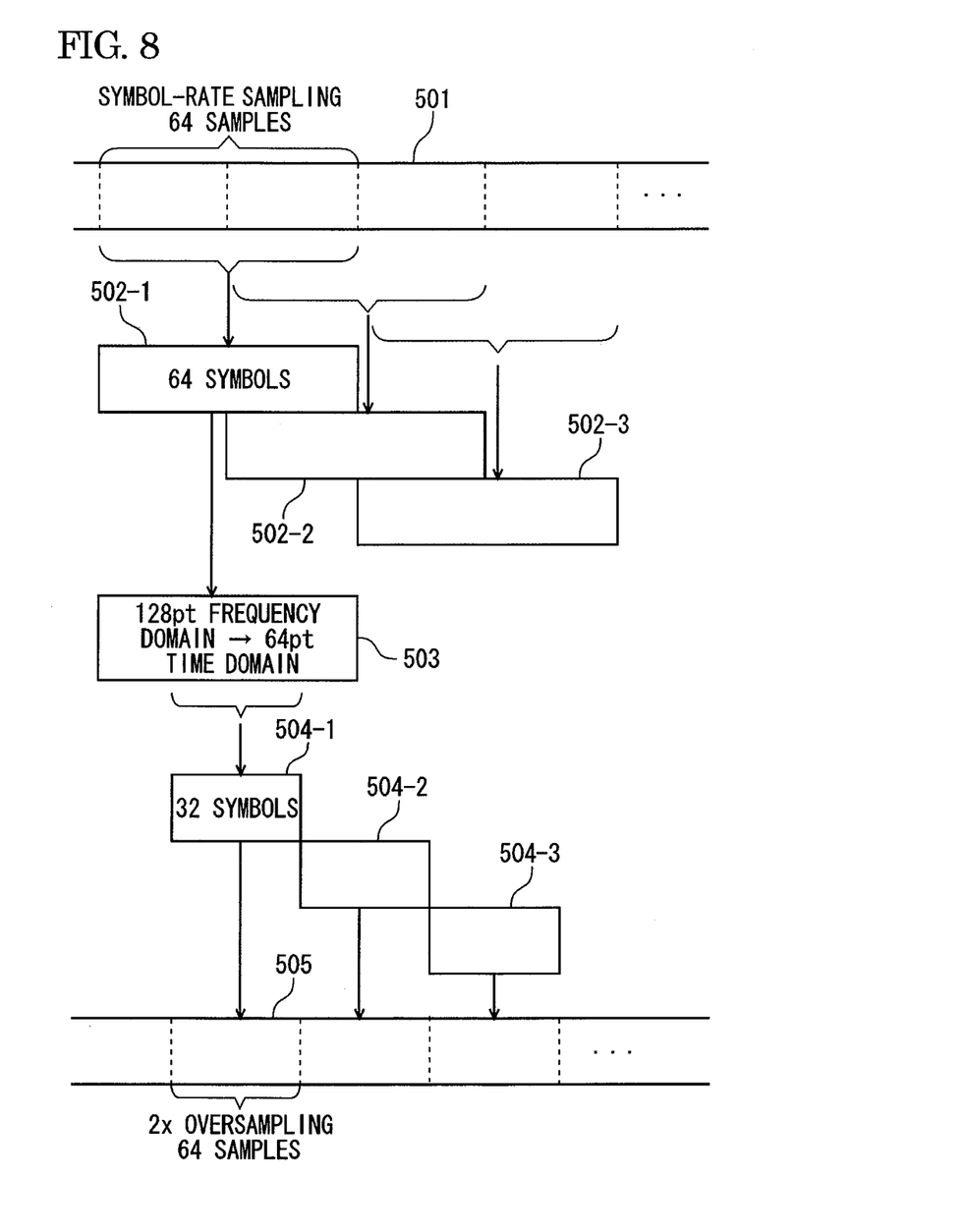
FIG. 8 is a diagram illustrating an example of a processing unit of a signal that is subject to correction.

FIG. 8 is a diagram illustrating an example of a processing unit of a signal that is subject to correction. In FIG. 8, a sample (symbol) sequence 501 of the symbol-rate sampling (1× oversampling) in which the symbol speed and the sample speed is the same, is input. The processing unit of the signal subject to the correction is set to N=64 symbols.

The serial/parallel converter 109 selects a sample sequence 502-1 of 64 samples which are equivalent to 64 symbols from the sample sequence 501. The serial/parallel converter 109 selects sample sequences 502 (502-1, 502-2 and 502-3) which are overlapped for each N/2=32 symbols (32 samples) as processing units.

With respect to each selected sample sequence 502, the 64 point Fourier transform and the distortion correction are performed by the distortion correction section 102 and then the sample sequence is converted into the time domain signal 503 with 128 samples (64 symbols) where the two times oversampling is performed, by means of the 128 point inverse Fourier transform.

From here, a partial sample sequence 504-1 out of the 64 samples (32 symbols) in the central part is selected and output. The sample sequences 502-2 and 502-3 are also processed in the same way, and are converted into sample sequences 504-2 and 504-3.

These sample sequences 504-1, 504-2, and 504-3 are concatenated, and the sample sequence 505 in which the over sampling is performed at the speed of P=two times with respect to the symbol speed is output while a continuity being maintained.

As described above, the transmission-reception device 10 according to the invention performs an FDE (Frequency Domain Equalization) using the distortion correction section 102 as an equalizer at the time of reception, and measures a passband of the RF section at the time of calibration. Furthermore, according to the transmission-reception device 10, the transmission-reception device is used as the frequency domain filter which performs an interpolation (oversampling) and a pre-distortion (distortion correction) at the time of transmission.

As a result, according to the transmission-reception device 10, it is possible to accurately correct the passband characteristics of the transmission RF circuit without significantly increasing the size of the circuit. Therefore, even in a case of the baseband signal in which the signal bandwidth ranges over the broadband due to the high symbol speed, it is possible to accurately correct the passband characteristics without significantly increasing the size of the circuit. In addition, it is possible to decrease the clock speed by parallelizing the signal processes.

Although a variety of embodiments has been described with reference to the drawings, it is needless to say that the invention is not limited to the examples. It is apparent to those skilled in the art that various modification examples and improvements may be obtained by contemplations within the scope of the disclosed claims, and thereby it is also understood that all those fall within the technical scope of the invention without any doubt.

In addition, in each configuration in the embodiments, it may be realized by an LSI which is an integrated circuit. The LSI may be integrated into a single chip, or may be integrated into a single chip by including a part or all of each configuration. Here, it is referred to as the LSI, it is also referred to as an IC, a system LSI, a super LSI or an ultra LSI depending on the difference in the degree of integration.

In addition, the method of circuit integration is not limited to the LSI, a dedicated circuit or a general-purpose processor may be used for the circuit integration. Furthermore, an FPGA (Field Programmable Gate Array) which is programmable after the LSI manufacturing, or a reconfigurable processor in which connecting and resetting of circuit cells are reconfigurable, may be used.

In addition, the functional blocks may be operated using a DSP or a CPU, for example. Furthermore, the processing steps can be recorded on a recording medium as a program and to be performed.

Furthermore, if there appears a circuit integration technology which replaces the LSI owing to an advanced semiconductor technology or another derivative technology, the functional blocks may be integrated using such a technology.

In addition, although in the above-described embodiment, a case of signal transmission and reception of a millimeter waveband wireless signal has been described, the invention may also be applied to a wireless signal including a centimeter waveband signal in the same manner.

Furthermore, the invention is widely applicable to the overall wireless communication devices including the mobile communication which requires a small sized circuit and low power consumption, as a transmission distortion correction circuit used in a single carrier communication.

The present application is based on Japanese Patent Application No. 2011-075832 filed on Mar. 30, 2011, the contents of which are incorporated herein by reference.

INDUSTRIAL APPLICABILITY

The present invention is useful because, in a transmission-reception device that transmits and receives a signal which is modulated using a single carrier transmission system, even in a case of a baseband signal in which a signal bandwidth ranges over a broadband due to a high symbol speed, it is possible to accurately correct passband characteristics without significantly increasing a size of a circuit.

REFERENCE SIGNS LIST

10: TRANSMISSION-RECEPTION DEVICE
101: DA CONVERTER
102: DISTORTION CORRECTION SECTION
103: MODULATOR
104: PARALLEL/SERIAL CONVERTER
105: PN POINT INVERSE-FOURIER/FOURIER TRANSFORMER
106: CORRECTION COEFFICIENT MULTIPLIER:
107: CORRECTION COEFFICIENT CALCULATOR
108: N POINT FOURIER/INVERSE-FOURIER TRANSFORMER
109: SERIAL/PARALLEL CONVERTER
201: AD CONVERTER
202: DISTORTION ESTIMATOR
302: RADIO FREQUENCY (RF) SECTION
303: SYNCHRONIZATION SECTION
304: DEMODULATOR
401: PREAMBLE
402: CHANNEL ESTIMATION FIELD
403: GUARD INTERVAL (GI)
404: DATA
C1, C2: SWITCHING SECTION
601, 702: CORRECTION COEFFICIENT

The invention claimed is:

1. A transmission-reception device, comprising:
a radio frequency section that performs a frequency conversion on a signal which is modulated using a single carrier transmission system;
a correction coefficient multiplier that multiplies a frequency domain signal by a distortion correction coefficient in the frequency conversion of the radio frequency section to correct a distortion;
a first transformer that converts a time domain signal into a frequency domain signal at a time of reception, and converts the frequency domain signal which is distortion-corrected by the correction coefficient multiplier into a time domain signal at a time of transmission; and
a second transformer that converts a time domain signal into a frequency domain signal at a time of transmission, and converts the frequency domain signal which is distortion-corrected by the correction coefficient multiplier into a time domain signal at a time of reception;
wherein the correction coefficient multiplier corrects transmission distortion characteristics in a transmission side of the radio frequency section at the time of transmission, and corrects reception distortion characteristics in the reception side of the radio frequency section and channel distortion characteristics at the time of reception.

2. The transmission-reception device according to claim 1, wherein
the first transformer converts a loopback signal from a transmission side to a reception side of the radio frequency section, into a frequency domain signal, at a time of calibration.

3. The transmission-reception device according to claim 2, further comprising:
   a distortion estimator that estimates distortion characteristics in the frequency conversion of the radio frequency section, based on the frequency domain signal into which the loopback signal is converted; and
   a correction coefficient calculator that calculates a correction coefficient which is inverse characteristics of the distortion characteristics estimated by the distortion estimator, wherein
   the correction coefficient multiplier multiplies the frequency domain signal by the correction coefficient calculated by the correction coefficient calculator, to correct the distortion at the time of transmission.

4. The transmission-reception device according to claim 1, wherein
   the second transformer performs an oversampling where a signal having P×N points, where P>1, is obtained from a signal having N points, with respect to the frequency domain signal which is converted at the time of transmission, and
   the correction coefficient multiplier multiplies the signal having P×N points by a correction coefficient, to correct the distortion.

5. The transmission-reception device according to claim 4, wherein
   the correction coefficient calculator calculates the correction coefficient by multiplying a coefficient for limiting a band.

6. The transmission-reception device according to claim 4, wherein
   the first transformer performs a Fourier transform or an inverse Fourier transform with a unit of the frequency domain signal or the time domain signal having P×N points; and
   the second transformer performs the Fourier transform or the inverse Fourier transform with a unit of the frequency domain signal or the time domain signal having N points, and
   wherein the correction coefficient multiplier, located between the first transformer and the second transformer, is used as a frequency domain filter which performs an interpolation and a distortion correction at the time of transmission.

* * * * *